(12) United States Patent
Shafiee Ardestani et al.

(10) Patent No.: US 11,687,764 B2
(45) Date of Patent: Jun. 27, 2023

(54) SYSTEM AND METHOD FOR INCREASING UTILIZATION OF DOT-PRODUCT BASED NEURAL NETWORK ACCELERATOR

(71) Applicant: Samsung Electronics Co., Ltd., Suwon-si (KR)

(72) Inventors: Ali Shafiee Ardestani, Santa Clara, CA (US); Joseph Hassoun, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 357 days.

(21) Appl. No.: 16/900,852

(22) Filed: Jun. 12, 2020

(65) Prior Publication Data

US 2021/0326682 A1 Oct. 21, 2021

Related U.S. Application Data

(60) Provisional application No. 63/011,599, filed on Apr. 17, 2020.

(51) Int. Cl.
*G06F 7/22* (2006.01)
*G06N 3/063* (2023.01)
(Continued)

(52) U.S. Cl.
CPC .............. *G06N 3/063* (2013.01); *G06F 7/24* (2013.01); *G06F 7/5443* (2013.01); *G06F 9/5027* (2013.01); *G06N 5/04* (2013.01)

(58) Field of Classification Search
CPC .. G06N 3/063; G06N 5/04; G06F 7/24; G06F 7/5443; G06F 9/5027
See application file for complete search history.

(56) References Cited

U.S. PATENT DOCUMENTS 10,747,844 B2 * 8/2020 Bannon ................. G06F 7/5443
10,949,496 B2 * 3/2021 Korthikanti ......... G06F 9/30036
(Continued)

FOREIGN PATENT DOCUMENTS

WO WO-2019086104 A1 * 5/2019 ............... G06N 3/08
WO WO-2019193317 A1 * 10/2019 ............... G06N 3/04
WO WO-2020158760 A1 * 8/2020

OTHER PUBLICATIONS

De Souza, C.R., "Action Recognition in Videos: Data-efficient approaches for supervised learning of human action classification models for video," UAB (Universitat Autonoma de Barcelona), Mar. 23, 2018, 209 pages.
(Continued)

*Primary Examiner* — Cheng Yuan Tseng
(74) *Attorney, Agent, or Firm* — Lewis Roca Rothgerber Christie LLP

(57) ABSTRACT

A method of flattening channel data of an input feature map in an inference system includes retrieving pixel values of a channel of a plurality of channels of the input feature map from a memory and storing the pixel values in a buffer, extracting first values of a first region having a first size from among the pixel values stored in the buffer, the first region corresponding to an overlap region of a kernel of the inference system with channel data of the input feature map, rearranging second values corresponding to the overlap region of the kernel from among the first values in the first region, and identifying a first group of consecutive values from among the rearranged second values for supplying to a first dot-product circuit of the inference system.

20 Claims, 10 Drawing Sheets

(51) Int. Cl.
    *G06F 7/24* (2006.01)
    *G06F 7/544* (2006.01)
    *G06F 9/50* (2006.01)
    *G06N 5/04* (2023.01)

(56) References Cited

U.S. PATENT DOCUMENTS

| | | | |
|---|---|---|---|
| 11,144,814 B2 * | 10/2021 | Cha | G06N 3/08 |
| 2018/0189652 A1 * | 7/2018 | Korthikanti | G06N 3/063 |
| 2018/0285731 A1 | 10/2018 | Heifets et al. | |
| 2018/0308260 A1 | 10/2018 | Robles-Kelly | |
| 2019/0026078 A1 | 1/2019 | Bannon et al. | |
| 2019/0042923 A1 | 2/2019 | Janedula et al. | |
| 2019/0068974 A1 | 2/2019 | Pohl | |
| 2019/0392297 A1 * | 12/2019 | Lau | G06N 3/04 |
| 2020/0202198 A1 * | 6/2020 | Lee | G06N 3/063 |
| 2020/0349420 A1 * | 11/2020 | Ovsiannikov | G06F 9/3001 |
| 2021/0019591 A1 * | 1/2021 | Venkatesh | G06N 3/08 |
| 2021/0019633 A1 * | 1/2021 | Venkatesh | G06F 5/01 |

OTHER PUBLICATIONS

Mairal, J., "Convolutional Kernel Networks," Lear Team, Inria Grenoble, Laboratoire Jean Kuntzmann, CNRS, Univ. Grenoble Alpes, France, 9 pages.

Ahmad, Afzal, et al., "Optimizing Hardware Accelerated General Matrix-Matrix Multiplication for CNNs on FPGAs," IEEE Transactions on Circuits and Systems—II: Express Briefs, vol. 67, No. 11, 2020, pp. 2692-2696.

Biswas, Avishek, et al., "CONV-SRAM: An Energy-Efficient SRAM With In-Memory Dot-Product Computation for Low-Power Convolutional Neural Networks," IEEE Journal of Solid-State Circuits, vol. 54, No. 1, 2019, pp. 217-230.

Dukhan, Marat, "The Indirect Convolution Algorithm," arXiv:1907. 02129v1 [cs:CV], Jul. 2019, 10 pages.

Suda, Naveen, et al., "Throughput-Optimized OpenCL-based FPGA Accelerator for Large-Scale Convolutional Neural Networks," Proceedings of the 2016 ACM/SIGDA International Symposium on Field-Programmable Gate Arrays, 2016, 10 pages.

* cited by examiner

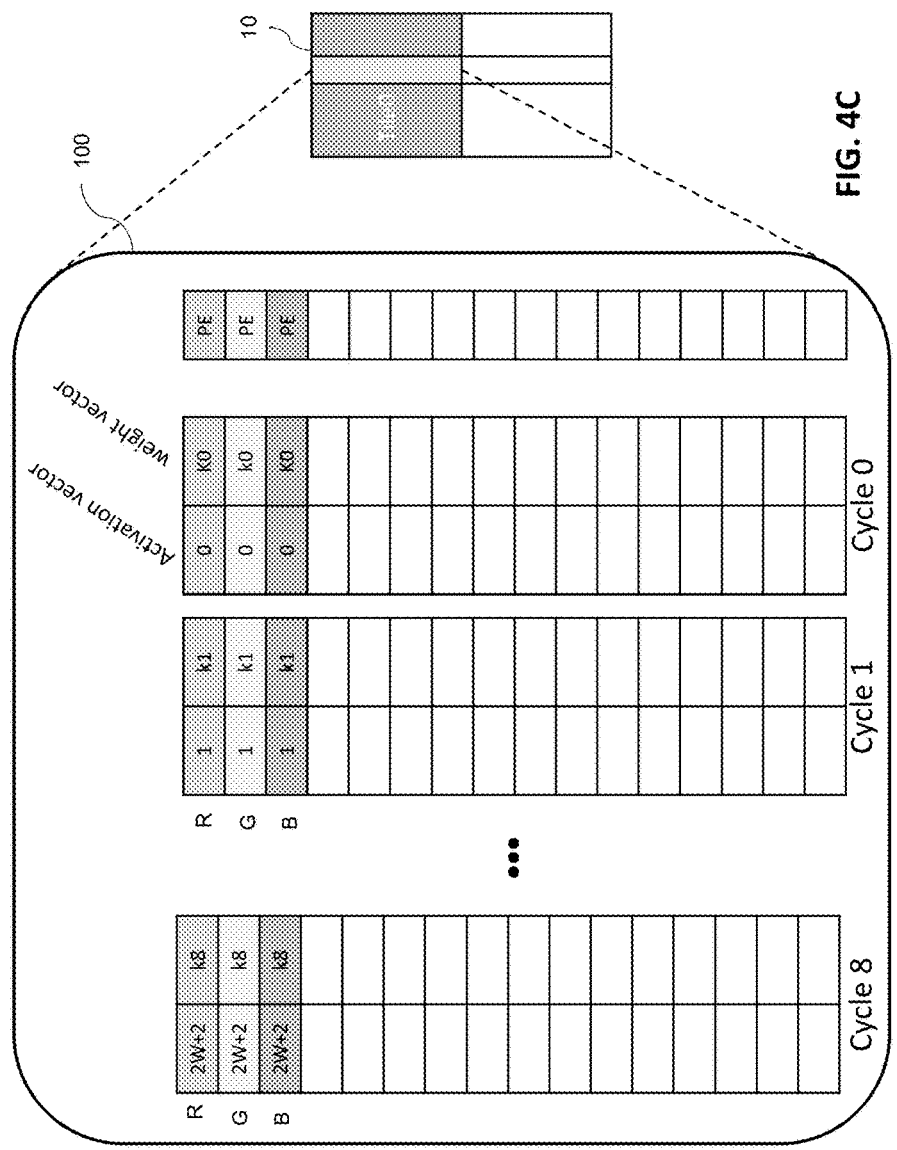
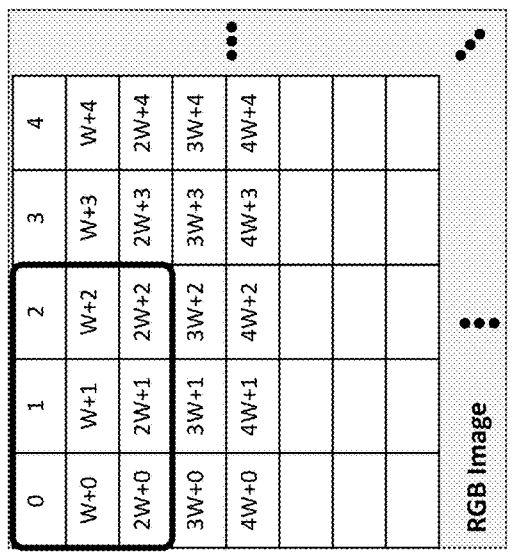
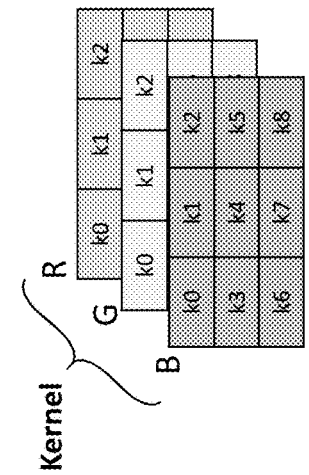
FIG. 4C
FIG. 4A
FIG. 4B

SYSTEM AND METHOD FOR INCREASING UTILIZATION OF DOT-PRODUCT BASED NEURAL NETWORK ACCELERATOR

CROSS-REFERENCE TO RELATED APPLICATION(S)

This application claims priority to, and the benefit of, U.S. Provisional Application No. 63/011,599 ("HARDWARE UNIT TO INCREASE UTILIZATION OF DOT-PRODUCT BASED DNN ACCELERATOR FOR RGB CNN LAYER"), filed on Apr. 17, 2020, the entire content of which is incorporated herein by reference.

FIELD

Aspects of embodiments of the present disclosure are generally related to machine learning.

BACKGROUND

Recently, machine learning has been successfully utilized in many different applications. The computations involved in training and using machine learning algorithms, such as neural networks, can benefit greatly from efficient parallel implementations. As a result, parallel processors such as graphic processing units (GPUs) have been widely used in the practical implementation of neural networks.

Generally, implementing machine learning systems can require a large amount of memory and computing power. In applications such as image recognition, neural network models may be many megabytes in size and the convolutional operations may include performing many billions of floating-point operations per second.

In computer vision applications, an input image may have three channels, red, green, and blue (RGB). As a result, the dot-product operations of the first layer of the neural network, which are often designed to operate on a large number of channels, are underutilized when processing only three channels (R, G, B). This inefficiency slows down the processing of RGB images and adversely affects the overall performance of the neural network.

Thus, what is desired is an accelerator for speeding up the operations performed by a neural network.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system and method for accelerating the convolution operations of an RGB layer of neural network inference system. In some embodiments, the acceleration is achieved by packing weights from different cycles of operation into the same weight-vector of a dot-product (DP) unit, reorganizing a 2-dimensional RGB image into a single dimension, and applying the packed weight vector to the flattened RGB image to increase DP utilization and to reduce the number of cycles associated with processing the RGB layer.

According to some embodiments of the present disclosure, there is provided a method of flattening channel data of an input feature map in an inference system, the method including: retrieving pixel values of a channel of a plurality of channels of the input feature map from a memory and storing the pixel values in a buffer; extracting first values of a first region having a first size from among the pixel values stored in the buffer, the first region corresponding to an overlap region of a kernel of the inference system with channel data of the input feature map; rearranging second values corresponding to the overlap region of the kernel from among the first values in the first region; and identifying a first group of consecutive values from among the rearranged second values for supplying to a first dot-product circuit of the inference system.

In some embodiments, a size of the buffer exceeds a maximum supported kernel size of a first layer of the inference system.

In some embodiments, the first size is equal to a maximum supported kernel size of a first layer of the inference system.

In some embodiments, the buffer is 2-dimensional first-in-first-out storage configured to store data in a circular manner.

In some embodiments, the retrieving the pixel values from the memory and storing the pixel values in the buffer includes: retrieving a group of values from the memory in a column-major order; identifying a subset of values among the retrieved group of values corresponding to a column of the buffer; and storing the subset of values in the column of the buffer.

In some embodiments, the buffer is a circular buffer having a start pointer and an end pointer, the end pointer indicating an index of the column of the buffer in which the subset of values is stored, and the retrieving the pixel values from the memory and storing the pixel values in the buffer further includes: updating the start and end pointers in response to the storing the subset of values.

In some embodiments, the extracting the first values from the buffer includes: storing a row of values from the buffer in a row buffer; and extracting a plurality of consecutive elements from the stored row of values beginning from a starting location along the row of values, wherein the first values include the plurality of consecutive elements.

In some embodiments, the rearranging the second values includes: identifying a second region including a number of columns of the first region that correspond to the overlap region; and rearranging values of the second region into a first one-dimensional vector, wherein the values of the second region form a first set of elements along the first one-dimensional vector.

In some embodiments, the rearranging the values of the second region is performed in a row-major order.

In some embodiments, the rearranging the second values further includes: identifying the second values from among values of the first one-dimensional vector that correspond to the overlap region; and rearranging the second values into a second one-dimensional vector, wherein the second values form a first set of elements along the second one-dimensional vector.

In some embodiments, the method further includes: loading the first group of consecutive values into an activation vector of the first dot-product circuit, wherein the first dot-product circuit is configured to calculate an inner product of the activation vector and a preloaded kernel weight vector.

In some embodiments, the method further includes: identifying a second group of consecutive values from among the rearranged second values for supplying to a second dot-product circuit of the inference system, wherein the second group of consecutive values is consecutive to the first group of consecutive values.

In some embodiments, the first and second group of consecutive values together include flattened pixel values of a channel of the input feature map that overlap with the kernel.

In some embodiments, the first size is 7×7 elements, and a size of the buffer is 7×N elements, where N is an integer greater than or equal to 7.

According to some embodiments of the present disclosure, there is provided a method of accelerating convolution of an input feature map in an inference system including a dot-product circuit, the method including: loading kernel weights corresponding to a channel of the plurality of channels of the input feature map into a kernel weight vector of the dot-product circuit; flattening channel data of the input feature map by: retrieving pixel values of a channel of a plurality of channels of the input feature map from a memory and storing the pixel values in a buffer; extracting first values of a first region having a first size from among the pixel values stored in the buffer, the first region corresponding to an overlap region of a kernel of the inference system with channel data of the input feature map; rearranging second values corresponding to the overlap region of the kernel from among the first values in the first region; and identifying a first group of consecutive values from among the rearranged second values for supplying to a first dot-product circuit of the inference system; loading the first group of consecutive values into an activation vector of the dot-product circuit; and calculating an inner product of the activation vector and the kernel weight vector to generate an output feature map.

In some embodiments, the flattening the channel data further includes: identifying a second group of consecutive values from among the rearranged second values for supplying to a second dot-product circuit of the inference system, wherein the second group of consecutive values is consecutive to the first group of consecutive values.

In some embodiments, the first and second group of consecutive values together include flattened pixel values of a channel of the input feature map that overlap with the kernel.

In some embodiments, the method further includes: loading the second group of consecutive values into the activation vector of the dot-product circuit.

According to some embodiments of the present disclosure, there is provided a image flattening circuit for flattening channel data of an input feature map in an inference system, the flattener including: a channel controller configured to retrieve pixel values of a channel of a plurality of channels of the input feature map from a memory and storing the pixel values in a buffer; a max sub-window isolator configured to extract first values of a first region having a first size from among the pixel values stored in the buffer, the first region corresponding to an overlap region of a kernel of the inference system with channel data of the input feature map; and a rearranging circuit configured to rearrange second values corresponding to the overlap region of the kernel from among the first values in the first region, and to identify a first group of consecutive values from among the rearranged second values for supplying to a first dot-product circuit of the inference system.

In some embodiments, the plurality of channels of the input feature map include a red channel, a green channel, and a blue channel.

BRIEF DESCRIPTION OF THE DRAWINGS

The accompanying drawings, together with the specification, illustrate example embodiments of the present disclosure, and, together with the description, serve to explain the principles of the present disclosure.

FIGS. 4A-4C illustrate the 8 cycles it takes to apply a 3-channel kernel of size 3×3 to a corresponding 3×3 region of an input image, without application of image flattening.

DETAILED DESCRIPTION

The detailed description set forth below is intended as a description of example embodiments of a system and method for pipelined machine learning acceleration, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Aspects of the present disclosure are directed to a neural network inference system capable of accelerating the convolution operations of its first convolutional layer, that is, the red-green-blue (RGB) layer. In some embodiments, the neural network inference system achieves this acceleration by packing weights from different cycles of operation into the same weight-vector, flattening a 2-dimensional RGB image into a single dimension, and applying the packed weight vector to the flattened RGB image to increase (e.g., maximize) utilization of dot-product elements in the convolutional layer and to reduce the number of cycles associated with processing the RGB layer. According to some examples, the pipelining scheme(s) of the neural network inference system may provide a several fold performance improvement over other inference accelerators of the related art.

Figure 1:
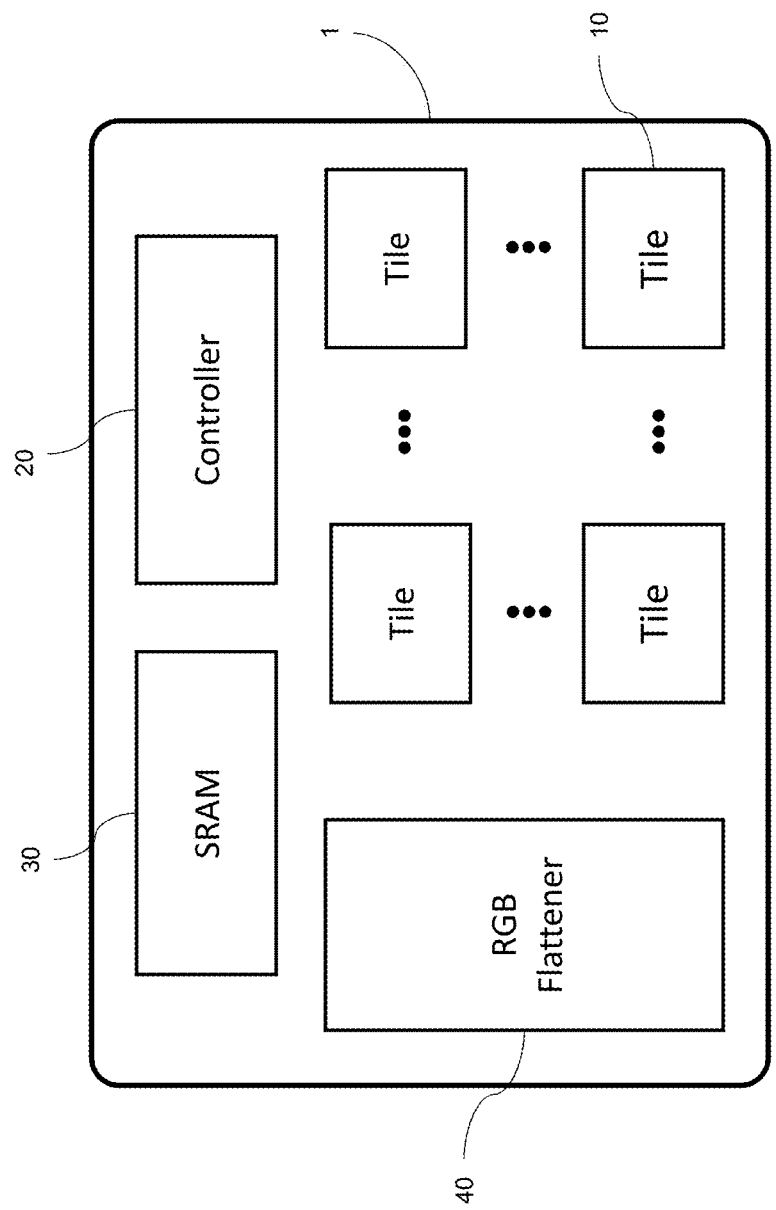
FIG. 1 is a block diagram illustrating an inference system, according to some embodiments of the present disclosure.

FIG. 1 is a block diagram illustrating an inference system 1, according to some embodiments of the present disclosure.

Referring to FIG. 1, the inference system 1, once trained, performs inference on input data (e.g., one or more images) to generate output data, which may be a prediction based on the input data. According to some embodiments, the inference system 1 includes a plurality of tiles 10 for performing inference operation, a controller 20 for controlling operations of the tiles 10, and a memory 30 (e.g., an on-logic-die memory) for temporarily storing the input data. The memory 30 may also store the outputs or intermediate results of each of the tiles 10 of the inference system 1. In some examples, the memory 30 may be an embedded magneto-resistive random access memory (eMRAM), a static random access memory (SRAM), and/or the like. According to some embodiments, the inference system 1 also includes an image flattener (e.g., an RGB flattener or image flattening circuit) configured to flatten (e.g., rearrange different elements of) an input RGB image to improve tile utilization in processing the input image.

Figure 2:
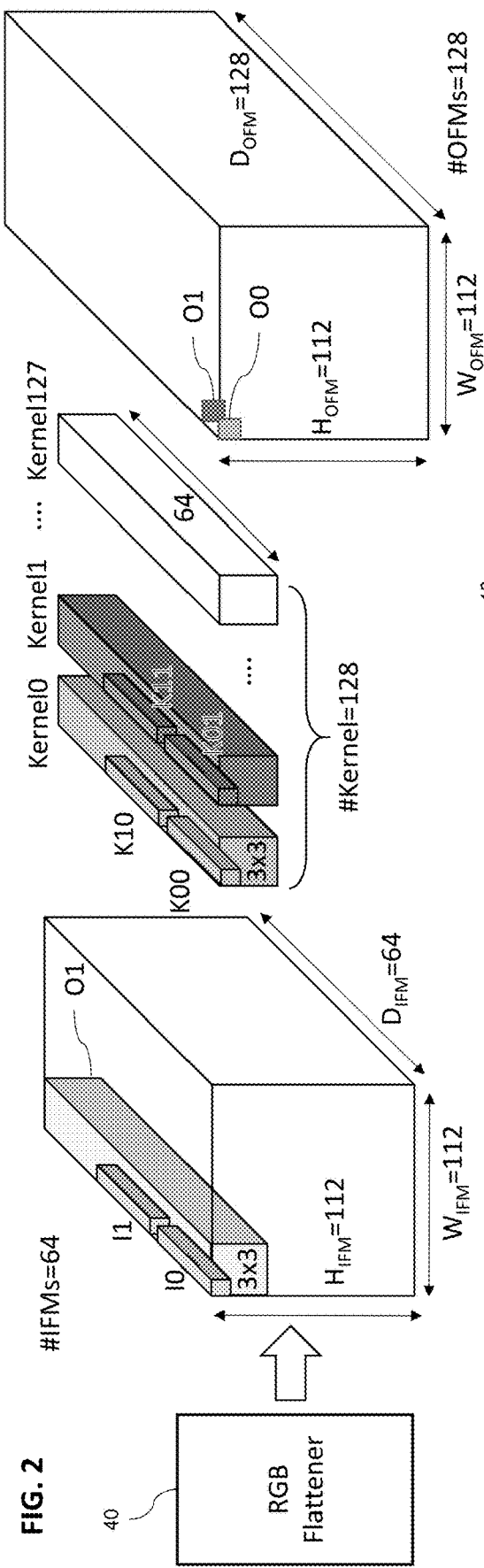
FIG. 2 is a conceptual diagram of one layer of the inference system performing convolutional operations on a plurality of input feature maps to generate a plurality of output feature maps, according to some embodiments of the present disclosure.
Figure 3:
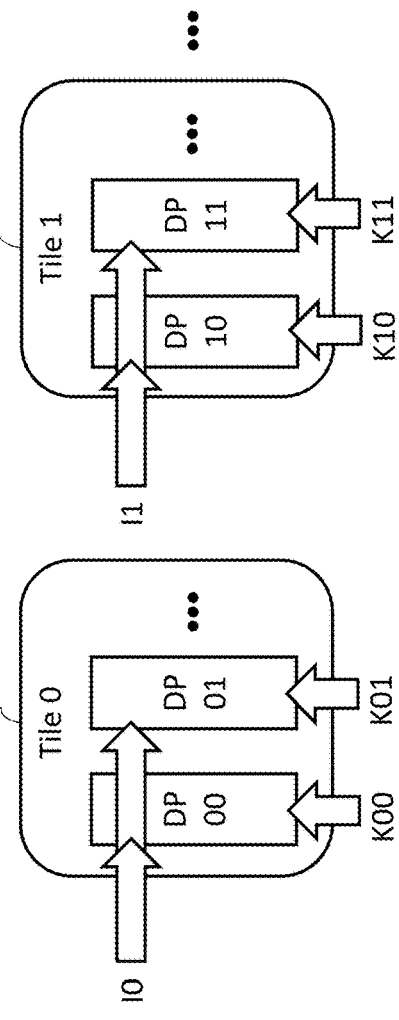
FIG. 3 is a block diagram illustrating the operation of first and second tiles of the inference system on corresponding inputs from input feature maps, according to some embodiments of the present disclosure.

FIG. 2 is a conceptual diagram of one layer of the inference system 1 performing convolutional operations on a plurality of input feature maps to generate a plurality of output feature maps, according to some embodiments of the present disclosure. FIG. 3 is a block diagram illustrating the operation of first and second tiles 10 on corresponding inputs from input feature maps, according to some embodiments of the present disclosure.

Referring to FIG. 2, the plurality of input feature maps may be represented by a 3-D block having a width $W_{IFM}$ (of, e.g., 112 values), a height $H_{IFM}$ (of, e.g., 112 values), and a depth $D_{IFM}$ (of, e.g., 64 values), where $H_{IFM}$ and $W_{IFM}$ represent the height and width of each 2-dimensional (2D) input feature map (IFM), and depth $D_{IFM}$ represents the number of input feature maps, which is also referred to as the number of channels. A plurality of filters/kernels may operate on the input feature maps to produce a plurality of output feature maps, which may also be represented as a 3-D block having a width $W_{OFM}$ (of, e.g., 112 values), a height $H_{OFM}$ (of, e.g., 112 values), and a depth $D_{OFM}$ (of, e.g., 128 values), where $H_{OFM}$ and $W_{OFM}$ represent the height and width of each 2D output feature map (OFM), and depth $D_{OFM}$ represents the number of output feature maps. Each kernel (e.g., Kernel0, Kernel1, etc.) may also be represented by a 3D block having dimensions Kx, Ky, and Kd (e.g., 3×3×64). In some examples, the depth Kd may be equal to the number of input channels $D_{IFM}$.

Each kernel may be applied to a corresponding volume of the input feature maps (e.g., as shown by the block I) and slid across the entire volume of the input feature maps to produce a corresponding output value (e.g., O0, O1, etc.).

According to some examples, each kernel may be decomposed into a number of dot-product (DP) units (e.g., DP circuits), each of which performs a vector-by-vector inner product operation. In some examples, the size of each vector may be 8, 16, 32, or the like. The inputs to each dot-product unit are the input feature map values in the same position (e.g., pertaining to the same pixel) but in different channels, as exemplified by I0 and I1 in FIG. 2.

Referring to FIGS. 2 and 3, each tile 10 (e.g., Tile0, Tile1, etc.) comprises a plurality of DP units from different kernels, which receive the same input from the input feature maps, but apply different weights (e.g., filter weights) to the shared input. For example, Tile 0 may include the DP units DP00, DP01, etc., which receive the set of weights K00 and K01 from Kernel0 and Kernel1, respectively, and each multiply a shared input, e.g., I0, by the corresponding set of weights (e.g., K00/K01). Further, Tile1 may include the DP units DP10, DP11, etc., which receive the set of weights K10 and K11 from Kernel0 and Kernel1, respectively, and each multiply a shared input, e.g., I1, by the corresponding set of weights (e.g., K10/K11). The inputs received by the tiles 10 changes as the kernels slide across the entire volume of the input feature maps. Here, the inputs I0 and I1 may represent consecutive sets of values (with, e.g., 16 values each) across the depth dimension of the input feature maps (i.e., each value in I0 and I1 is from a different channel/input feature map). The sets of weights K00 and K10 represent consecutive weights value across the depth dimension of the Kernel0 (i.e., each value in K00 and K10 is from a different filter channel of Kernel0. Similarly, the sets of weights K01 and K11 represent consecutive weights value across the depth dimension of the Kernel1 (i.e., each value in K10 and K11 is from a different filter channel of Kernel1). The number of tiles 10 may be equal to the number of kernels (e.g., 128) or may be less than the number of kernels, in which case one or more tiles may be loaded with weights from different kernels at different times.

The output feature maps generated via the application of the kernels on the input feature maps may be used as the input feature maps to the next layer of the inference system 1. The output feature maps generated by a layer of the may be temporarily stored in the memory 30.

In the first layer of the inference system 1 (as, e.g., shown in FIG. 2), the input feature maps (IFMs) may correspond to an input RGB image. As the RGB image has only three channels (red, green, and blue), while the input feature maps operated on by the kernels may have a much larger number of channels (e.g., 64, as shown in FIG. 2), loading the RGB channels into the input feature maps, as is done in the related art, may result in significant underutilization of the DP units. For instance, in the example of FIG. 2, only the first three channels of the input feature maps may be occupied with non-zero values, and for the 16-wide dot-products, the utilization would be only 18.75%. As a result, in the related art, it may take multiple processing cycles to process the different inputs and weights to compute a single output in the RGB layer, which may be the first neural layer in the inference system 1.

Thus, according to some embodiments, the RGB flattener 40 "flattens", that is, reorganizes/rearranges the pixel values (e.g., the pixel intensity values) of the three RGB channel of an image to populate more of the input feature maps with the pixel value of the input image RGB channels, which results in higher utilization of dot-product values and a reduction in the number of cycles used to process a single output at the RGB layer.

FIGS. 4A-4C illustrate the 8 cycles it takes to apply a 3-channel (RGB) kernel of size 3×3 to a corresponding 3×3 region of an input RGB image, without application of image flattening. FIG. 4A illustrates a channel of the input image with width W; FIG. 4B illustrates a 3-channel (RGB) kernel of size 3×3; and FIG. 4C illustrates the activation inputs and the kernel weights applied to a DP unit 100 of a tile 10 during the 8 cycles it takes for the DP unit 100 to complete the application of the 3-channel kernel of FIG. 4B to a 3×3 region of the input image of FIG. 4A.

Here, the 16-element DP unit 100 unrolls in the channel direction, and because the input image and the corresponding kernel only have three channels, only 3 out of the 16 dot product operations are utilized at any given time. Thus, it takes 8 cycles for the DP unit 100 to apply the 27 kernel weight values (from 3 channels of 3×3 set of weights).

Utilization of the DP unit may be significantly improved by utilizing the RGB flattener 40 to flatten the three RGB channels of the input image prior to application of the DP unit 100.

Figure 5C:
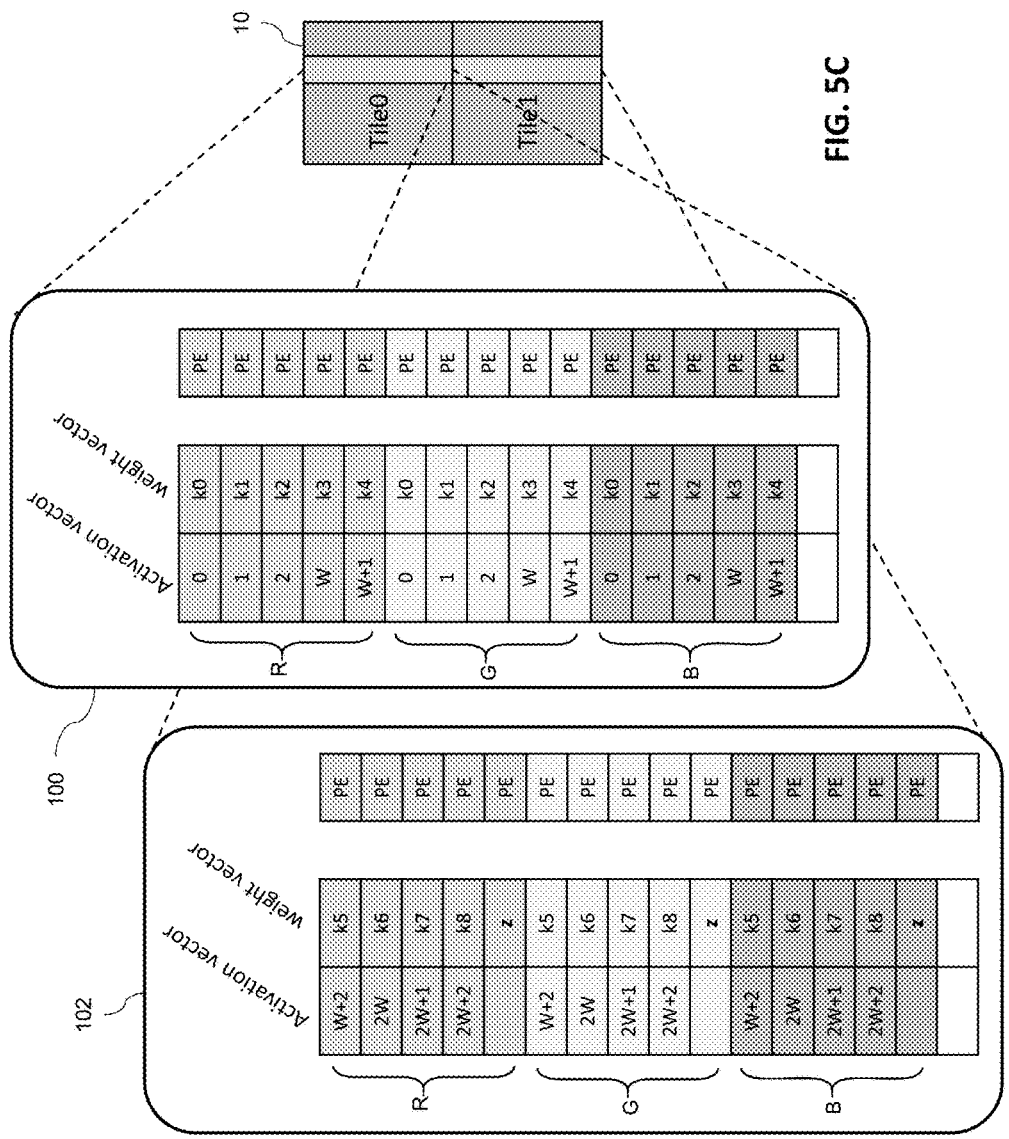
FIGS. 5A-5C illustrate the one cycle it takes to apply the 3-channel kernel of size 3×3 to a corresponding 3×3 region of an input image, when utilizing an image flattener, according to some embodiments of the present disclosure.
Figure 5A:
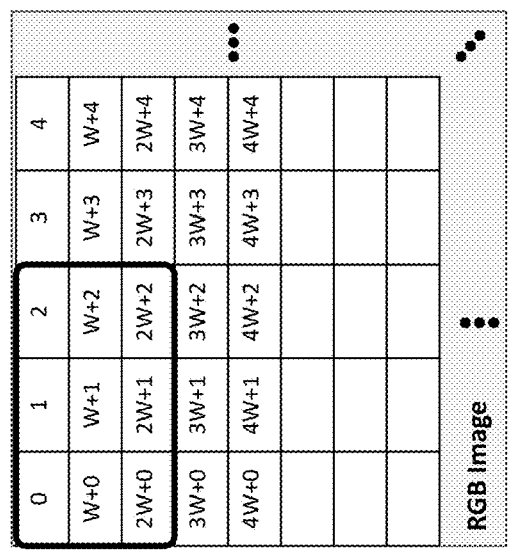
Figure 5B:
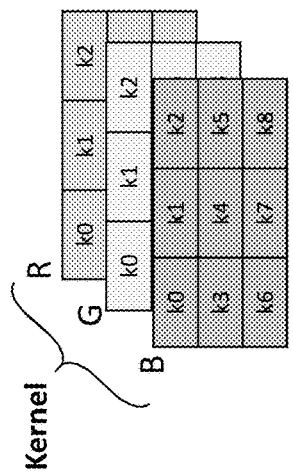

FIGS. 5A-5C illustrate the 1 cycle it takes to apply a 3-channel (RGB) kernel of size 3×3 to a corresponding 3×3 region of an input RGB image, when utilizing the RGB flattener 40, according to some embodiments of the present disclosure. FIG. 5A illustrates a channel of the input image with width W; FIG. 5B illustrates a 3-channel (RGB) kernel of size 3×3; and FIG. 5C illustrates the activation inputs and the kernel weights applied to the DP units 100 and 102 of Tile® and Tile1, respectively, during the 1 cycle it takes for the DP units 100 and 102 to complete the application of the 3-channel kernel of FIG. 5B to a 3×3 region of the input image of FIG. 5A. For ease of illustration, the kernel weights corresponding the three color channels (R, G, B) are shown as being the same, however, embodiments of the present disclosure are not limited thereto, and each channel of a kernel may have a different set of weights. Further, while FIGS. 5A-5B illustrate an example in which the kernel has a 3×3 dimension, this is only for ease of illustration and embodiments of the present disclosure are not limited thereto. For example, the kernel may have any suitable dimension, such as 2×4, 1×6, 5×5, 7×7, etc.

According to some embodiments, the inference system 1 arranges (e.g., packs) the kernel weights associated with different cycles of a DP unit (see, e.g., FIG. 4C) into a weight vector supplied to one or more DP units. In the example of FIGS. 5A-5C, the 27 weights of the 3-channel, 3×3 kernel may be packed in one 32-element vector that is split between two 16-element DP units 100 and 102 to substantially increase utilization of DP elements. In the example of FIGS. 5A-5C, this allows the inference system to perform all the corresponding operations in one cycle, as opposed to the 8 cycles of the example of FIGS. 4A-4C. Because during an inference operation the kernel weights are static and known in advance, the 32-element vector may be preloaded into the corresponding DP units 100 and 102 prior to beginning inference operation (e.g., prior to retrieving the input RGB image).

In some embodiments, the RGB flattener 40 reorganizes the RGB pixel values to provide corresponding input activations to the packed weight vector of the one or more DP units, so that the dot product operation of the kernel takes fewer cycles to complete. The RGB flattener 40 may receive pixel values of the input RGB image in row or column major format and may rearrange them to match the packed weight vector.

In examples in which each tile comprises DP units that are 16 elements wide (i.e., can perform 16 dot-product operations, as in the examples of FIGS. 5A-5C), the weight and activation vectors of each DP unit may be divided into three groups of 5 elements. Thus, the 9 elements of each channel of a 3×3 kernel may be split between two 5-element groups of the weight vector that can be processed by two different DP units (e.g., DP units 100 and 102), and the pixel values corresponding to each kernel weight may be rearranged in the corresponding two 5-element groups of the activation vector. In some examples, unused elements of the DP units may be filled with zeros.

Given the 16-wide DP unit and the three channels of the input image, groupings of five elements may yield the best utilization, as up to 15 of the 16-elements of the DP units may be populated at any given time.

In some embodiments, the RGB flattener 40 repopulates the activation vectors of the one or more DP units (e.g., DP units 100 and 102) every time the kernel shifts/slides across the input image to cover a different overlap region of the input image (also referred to as a kernel overlap region or a sub-window).

Assuming a particular size for the DP units (e.g., 16 elements wide), and a particular group size (e.g., a group size of 5 elements), the number of active tiles, DP utilization, and the number of cycles used to complete the convolution of one sub-window of the input feature map may be determined based on the kernel size.

For example, as shown in FIG. 5C, a 3×3 kernel may be unrolled to two active tiles (as [9 elements/5 elements in a group]=2 groups) with a utilization of active tiles at 84.4% (=27 kernel values/32 DP elements).

A 5×5 kernel may be unrolled to 5 active tiles (as [25 elements/5 elements in a group]=5 groups). If unrolled to 2 active tiles (which would entail 3 cycles to complete), utilization of active tiles may be at about 78.1% (=(25 kernel value×3 channels)/(4×16 element DPs×3 cycles)).

A 7×7 kernel may be unrolled to 10 active tiles (as [49 elements/5 elements in a group]=10 groups). If unrolled to 2 active tiles (which would entail 5 cycles to complete), utilization of active tiles may be at about 92% (=(49 kernel value×3 channels)/(2×16 element DPs×5 cycles)). If unrolled to 4 active tiles (which would entail 3 cycles to complete), utilization of active tiles may be at about 76.5% (=(49 kernel value×3 channels)/(4×16 element DPs×3 cycles)).

Accordingly, by flattening the input image and packing the weight vector, the inference system 1 utilizing the RGB flattener 40 can achieve significantly greater utilization than the related art.

Figure 6:
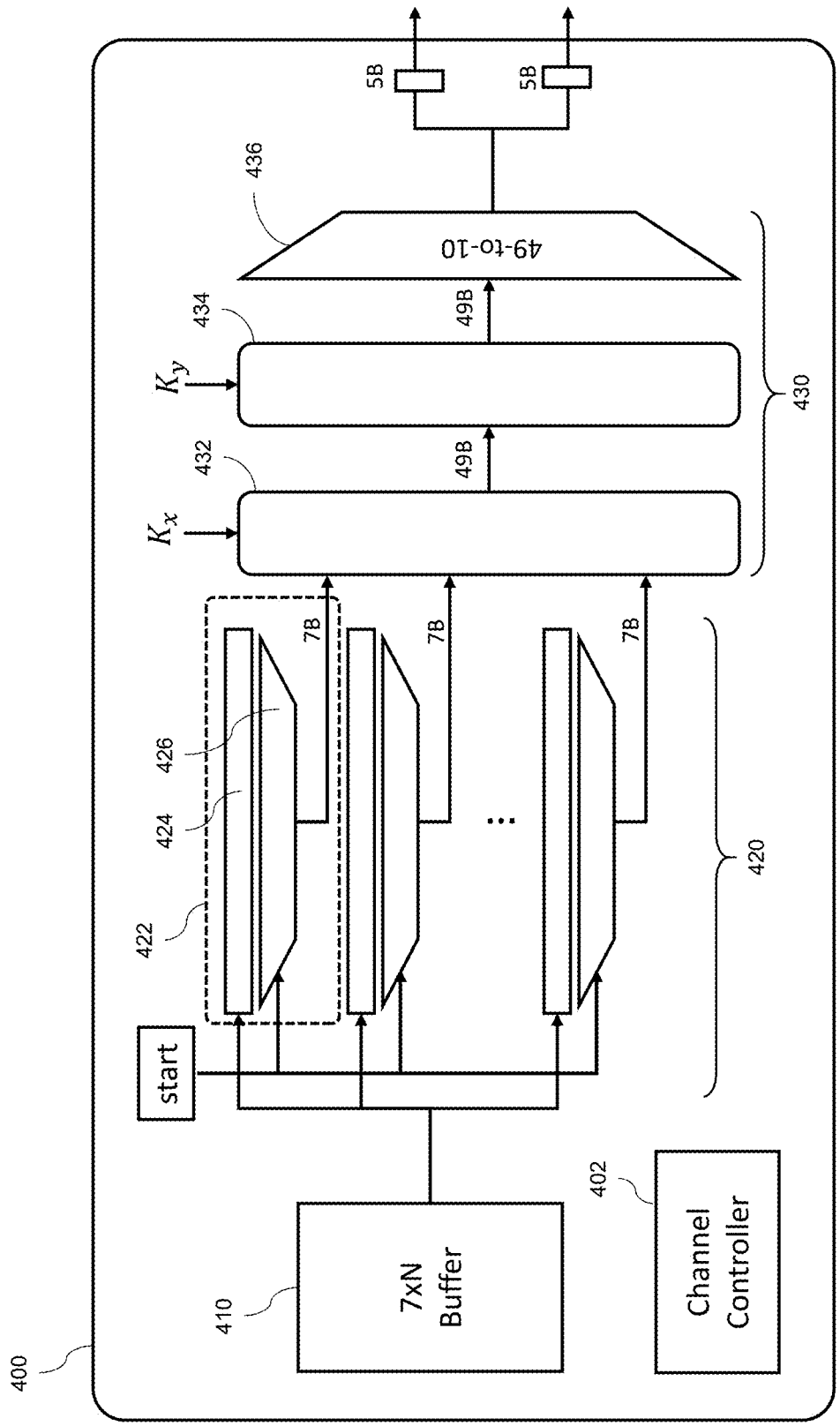
FIG. 6 is a schematic diagram illustrating a channel flattener of the image flattener, according to some embodiments of the present disclosure.

FIG. 6 is a schematic diagram illustrating a channel flattener 400 of the RGB flattener 40, according to some embodiments of the present disclosure.

According to some embodiments, the RGB flattener 40 includes a plurality of (e.g., three) channel flatteners 400, each of which flattens a corresponding one of the channels (e.g., R, G, or B) of the input RGB image. Each channel flattener 400 includes a channel controller 402, a buffer 410, a max sub-window isolator (e.g., a maximum sub-window size isolator) 420, and a rearranging circuit 430. The RGB flattener 40 is configured to support a maximum kernel size of $K_{ymax} \times K_{xmax}$, where $K_{ymax} \times K_{xmax}$ are integers greater than 1 and $K_{ymax}$ represents the number of rows in the buffer 410 and $K_{xmax}$ represents the number of columns in the buffer 410. For example, when the maximum supported kernel size for which the RGB flattener 40 is designed is 7×7, the RGB flattener 40 is capable of supporting any smaller or equal-size kernel, such as 2×2, 3×3, 2×4, 5×5, 5×7, 7×7, etc.

In some embodiments, the buffer 410 is a circular buffer with a size that is greater than or equal to the maximum supported kernel size. According to some embodiments, the buffer 410 is a $K_{ymax} \times N$ buffer, where N is an integer greater than or equal to $K_{ymax}$. For example, when the maximum supported kernel size is 7×7, the buffer 410 may be a 7×16 buffer. The buffer 410 retrieves a portion of the input image corresponding to its size for further processing by the RGB flattener 40.

According to some embodiments, the max sub-window isolator 420 includes a plurality of row isolators 422, each of which includes a row buffer 424 and a data selector (e.g., a circular multiplexer) 426. Each row isolator 422 extracts $K_{xmax}$ (e.g., 7) consecutive pixel values, beginning from a start index START, from a corresponding row of the buffer 410. Thus, the max sub-window isolator 420 extracts a $K_{ymax} \times K_{xmax}$ region 411 (also referred to as a first region) of the $K_{ymax} \times N$ data stored in the buffer 410 that corresponds to the sub-window (i.e., the kernel overlap region).

In some embodiments, the rearranging circuit 430 includes a first reordering circuit 432, a second reordering circuit 434, and a masking circuit 436. The first reordering circuit 432 identifies a number of columns from the $K_{ymax} \times K_{xmax}$ region that correspond to the sub-window as a second region, and reorders the values within the two-dimensional block of the second region 413 into a first one-dimensional vector, where the values of the second region 413 form the first set of elements along the first one-dimensional vector. The second reordering circuit 434 identifies values in the first one-dimensional vector that correspond to the sub-window and rearranges these values into a second one-dimensional vector, wherein the values corresponding to the sub-window form the first set of elements along the second one-dimensional vector. The masking circuit 436 then identifies the first ten elements within the second one-dimensional vector and splits them into two 5-element groups to be provided to DP units of two separate tiles.

The channel controller 402 may control the operations of the buffer 410, the max sub-window isolator 420, and the rearranging circuit 430 based on the size of the kernel.

Figure 7:
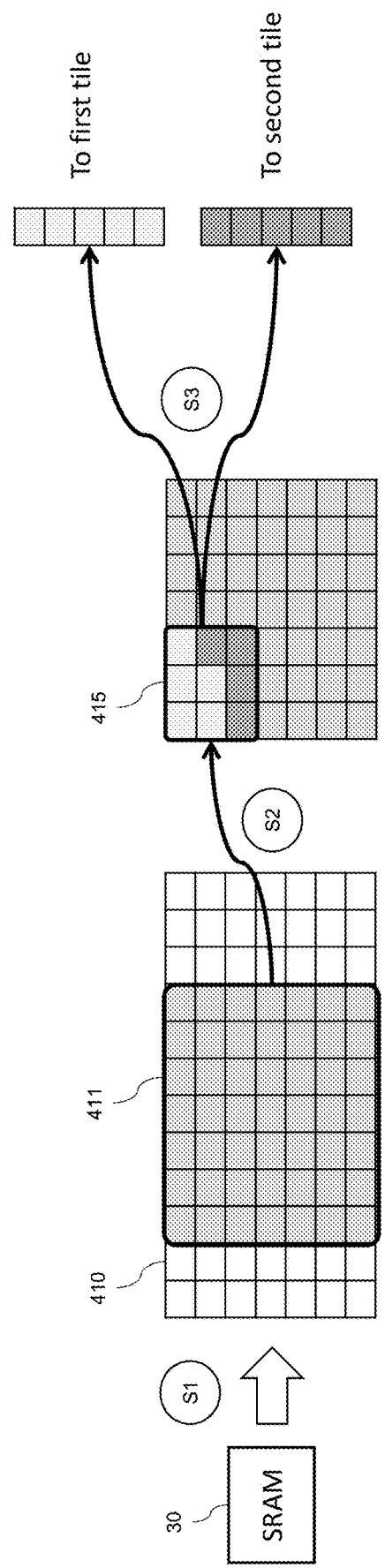
FIG. 7 is a graphical representation of the process of flattening a sub-window of a channel of an input RGB image, according to some embodiments of the present disclosure.

FIG. 7 is a graphical representation of the process of flattening a sub-window of a channel of the input RGB image, according to some embodiments of the present disclosure.

Referring to FIG. 7, for each color channel (R, G, and B) of the input image, a corresponding channel flattener 400 retrieves a $K_{ymax} \times N$ (e.g., a 7×16) portion of channel data from the memory storing the input image (S1); isolates a current $K_{ymax} \times K_{xmax}$ (e.g., 7×7) activation 411 from the $K_{ymax} \times N$ portion; then, depending on the kernel size, selects and flattens a desired portion of the $K_{ymax} \times K_{xmax}$ activation (e.g., a 3×3 sub-window 415); and extracts the flattened activations 5 at a time and send to an appropriate tile 10. For example, when the kernel size is 6×6, the output of the channel flattener 400 would be 36 activations that are selected/picked 5 at a time.

Figure 8B:
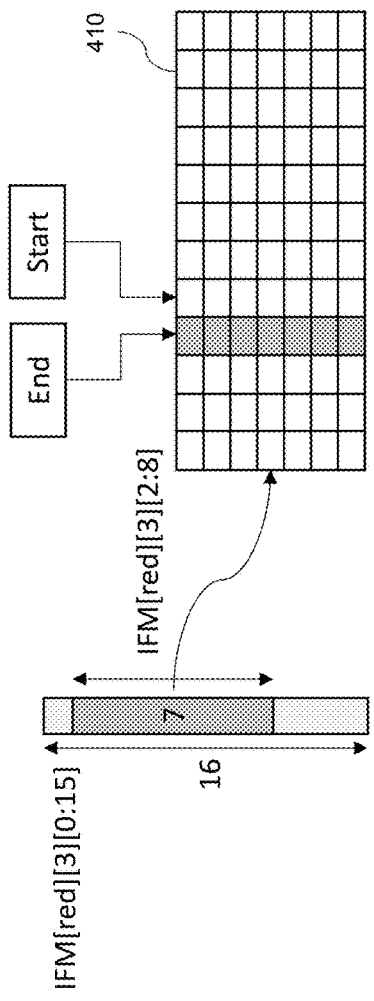
FIGS. 8A-8D illustrate examples in which input image channel data is retrieved from a memory and stored in a buffer of the channel flattener, according to some embodiments of the present disclosure.
Figure 8D:
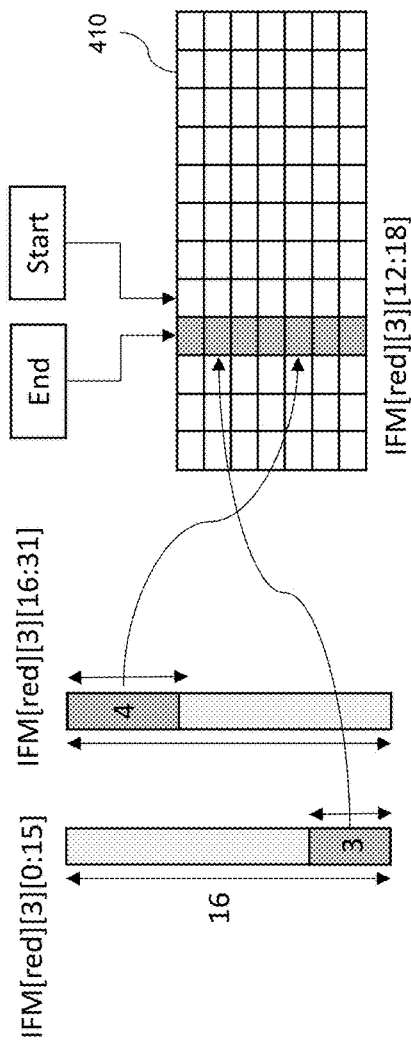
Figure 8A:
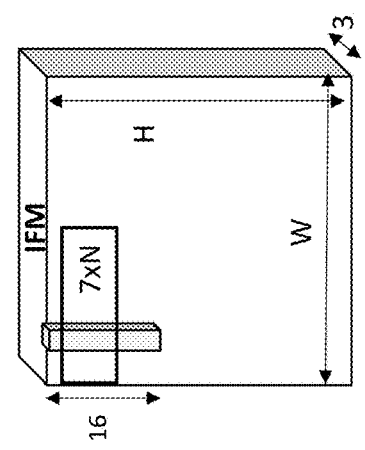
Figure 8C:
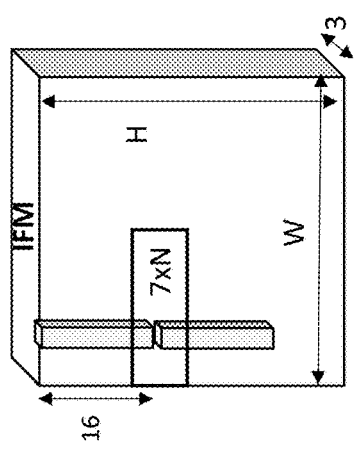

FIGS. 8A-8D illustrate examples in which input image channel data is retrieved from the memory 30 and stored in the buffer 410, according to some embodiments of the present disclosure. FIGS. 8A-8B illustrate an example in which the buffer data is retrieved from a single 16-element high row of the memory 30, and FIGS. 8C-8D illustrate an example in which the buffer data is retrieved from two 16-element high rows of the memory 30, according to some embodiments of the present disclosure.

According to some embodiments, the buffer 410 is sized to be larger than the maximum supported kernel size of $K_{ymax} \times K_{xmax}$. As the memory 30 may be accessed by many different circuits, the memory 30 may not always be immediately accessible, and the process of retrieving image data from the memory 30 may become a bottleneck that limits the speed at which a kernel may be applied to the input image. Therefore, increasing the size of the buffer 410 relative to the maximum supported kernel size of $K_{ymax} \times K_{xmax}$, may reduce the number of memory fetches that may be performed, thus improving the operational speed of the first layer (e.g., the RGB layer) of the inference system 1.

Input data (e.g., pixel values) may be read from the memory 30 in a column-major or row-major order. For example, as illustrated in FIGS. 8A-8D, the channel controller 402 may read the input data in a column-major order in groups of 16 values.

In some embodiments, the channel controller 402 retrieves a group of pixel values (e.g., 16 pixel values) from the memory 30 in a column-major order, identifies a subset of values (e.g., 7 values) among the retrieved group of values corresponding to a column of the buffer 410, and stores the subset of values in the column of the buffer 410. This process may be repeated until all of the columns of the buffer 410 are populated with corresponding pixel values from the memory 30.

As shown in FIGS. 8A-8B, when the sub-window (i.e., the region of the input image overlapping the kernel) falls within one 16-element high row of the memory 30, the retrieved $K_{ymax} \times N$ data may read column by column by retrieving 16-elements groups of values from a single row of memory. In the example of FIGS. 8A-8B, the fourth column of the 7×N buffer corresponds to the $3^{rd}$ to $9^{th}$ elements of the fourth column of the red channel of the input image, that is, IFM [red][3][2:8], and is read from the group of 16 elements at IFM[red][3][0:15].

As shown in FIGS. 8C-8D, when the sub-window falls overlaps with two 16-element high rows of the memory 30, each column of the retrieved $K_{ymax} \times N$ data may read by retrieving two 16-elements groups from consecutive rows of memory. In the example of FIGS. 8C-8D, the fourth column of the 7×N buffer corresponds to the last three elements from a first group of 16 elements at IFM[red][3][0:15] and the first four elements from a second group of 16 elements at IFM[red][3][16:31].

According to some embodiments, the buffer 410 is a circular buffer, whereby rather than shift data to accommodate new data and remove old data, data stored in the buffer 410 is not shifted and the start and end pointers are updated accordingly. The end pointer may point to the location (e.g., column) within the buffer 410 to which new data is to be written, and the start pointer may point to the beginning location (e.g., beginning column) within the buffer 410 where the old data is stored.

Figure 9:
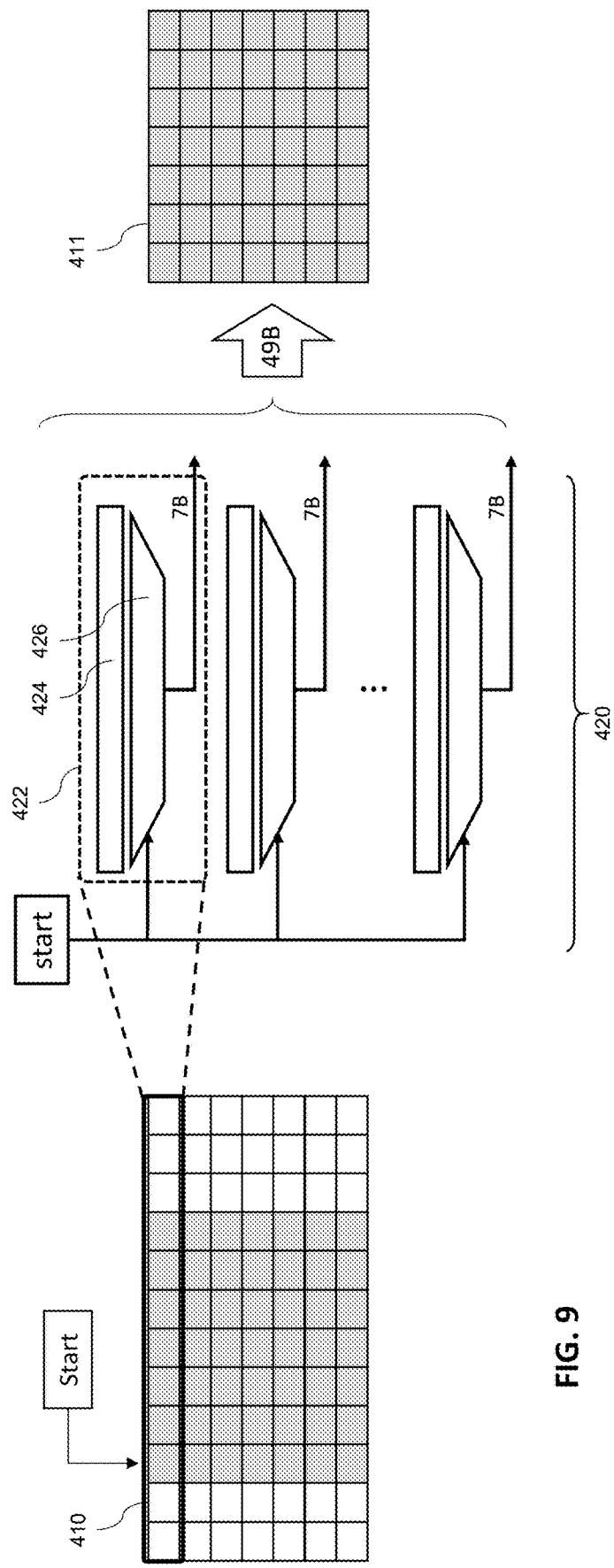
FIG. 9 is a block diagram illustrating the operation of a row isolator of a max sub-window isolator on the retrieved data within the buffer, according to some embodiments of the present disclosure.

FIG. 9 is a block diagram illustrating the operation of each row isolator 422 of the max sub-window isolator 420 on the retrieved data within the buffer 410, according to some embodiments of the present disclosure.

According to some embodiments, each row isolator 422 of the max sub-window isolator 420 corresponds to a different row of the buffer 410. In some embodiments, a row isolator 422 loads the image data in a corresponding row of the buffer 410 (having N elements) into a row buffer 424, and the data selector 426 extracts $K_{xmax}$ (e.g., 7) consecutive pixel values from the buffered data, beginning from a start index START. The start index START may be the column index marking the beginning of a $K_{ymax} \times K_{xmax}$ in such a way that the sub-window resides in the top left corner of the $K_{ymax} \times K_{xmax}$ window. As the kernel moves across the input image, the channel controller 402 may adjust (e.g., increment in a circular fashion) the start index accordingly. Accordingly, the max sub-window isolator 420 extracts pixel values in the $K_{ymax} \times K_{xmax}$ region 411 (also referred to as a first region) of the buffer 410 that corresponds to the sub-window (i.e., the kernel overlap region). Herein, the extracted pixel values in the first region 411 may be referred to as first values.

Figure 10:
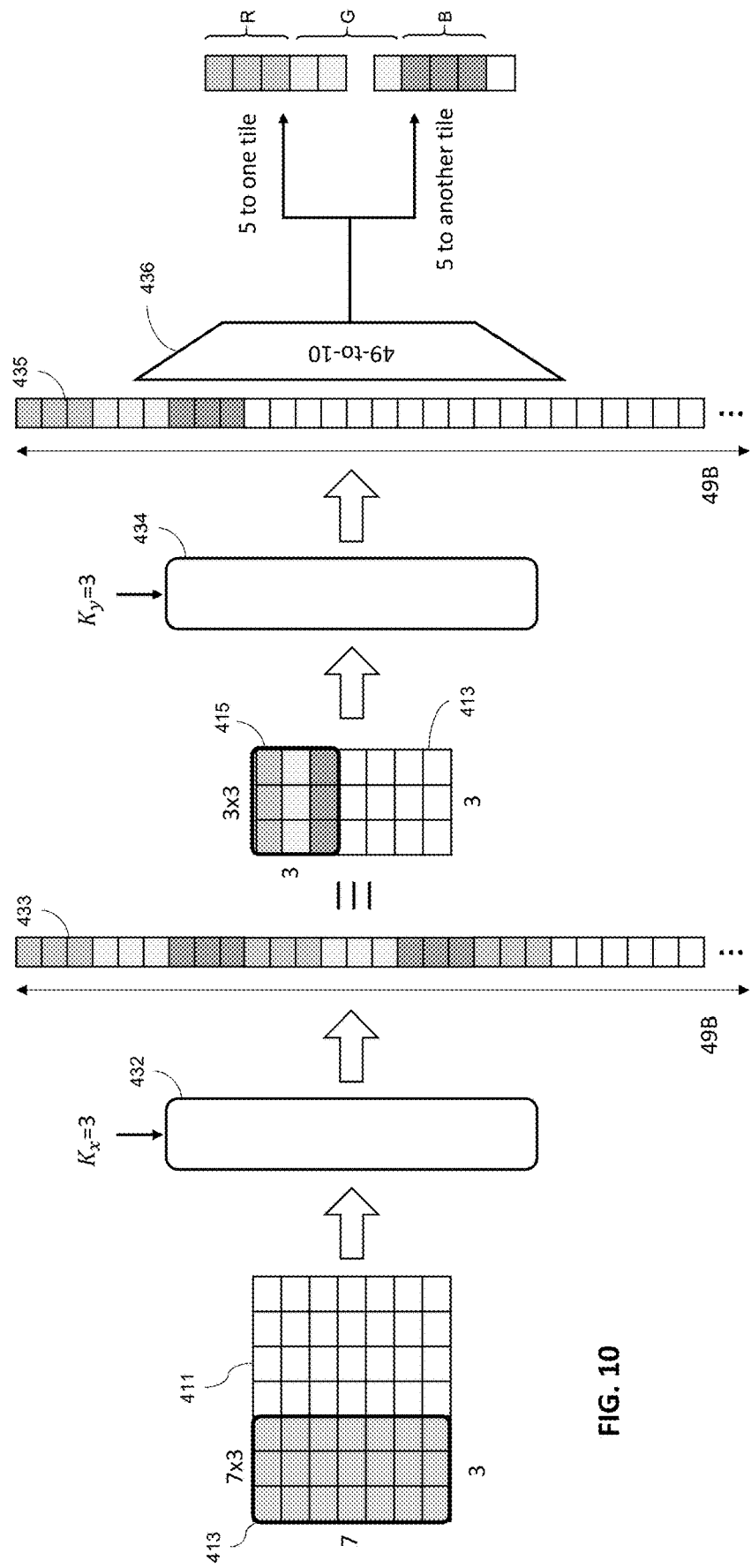
FIG. 10 illustrates the operation performed by a rearranging circuit 430 of the channel flattener, according to some embodiments of the present disclosure.

FIG. 10 illustrates the operation performed by the rearranging circuit 430 on the $K_{ymax} \times K_{xmax}$ region 411, according to some embodiments of the present disclosure.

Referring to FIG. 10, in some embodiments, the rearranging circuit 430 rearranges/reorganizes/flattens values (e.g., second values) corresponding to the sub-window, from among the first values in the first region 411, in a one-dimensional vector. According to some embodiments, the first reordering circuit 432 of the rearranging circuit 430 receives the $K_{ymax} \times K_{xmax}$ region (i.e., the first region) 411 from the max sub-window isolator 420, and identifies a second region 413 including a number of columns (e.g., $K_x$ columns) of the region 411 that correspond to the sub-window. Here, the kernel has a size of $K_x \times K_y$, where $K_x$ and $K_y$ are integers greater than or equal to one. In the example of FIG. 19, the kernel has a size of 3×3. The first reordering circuit 432 then reorders (e.g., serializes) the values within the two-dimensional block of the second region 413 into a first one-dimensional vector 433, where the values of the second region 413 form the first set of elements along the first one-dimensional vector 433. In some embodiments, the second region 413 reads the values in the second region 413 in a row-major order; however, embodiments of the present disclosure are not limited thereto, and the second region 413 may read the values in the second region 413 in a column-major order. In the examples of FIG. 10, the first set of values in the first one-dimensional vector 433 are the 21 values in the 7×3 second region 413, which are read in row-major order.

According to some embodiments, the second reordering circuit 434 identifies values in the first one-dimensional vector 433 that correspond to the sub-window 415 and rearranges these values into a second one-dimensional vector 435, wherein the values corresponding to the sub-window 415 form the first set of elements along the second one-dimensional vector 435. In the example of FIG. 10, the sub-window 415 is a 3×3 region of the input image that overlaps with the 3×3 kernel, and the first set of values in the second one-dimensional vector 435 are the 9 values in the sub-window region 415.

In some embodiments, the masking circuit 436 then identifies the first ten elements within the second one-dimensional vector 435 and splits them into two 5-element groups 437 and 438, which are provided to the DP units of two separate tiles 10 (e.g., Tile® and Tile1 in FIG. 5C).

Figure 11:
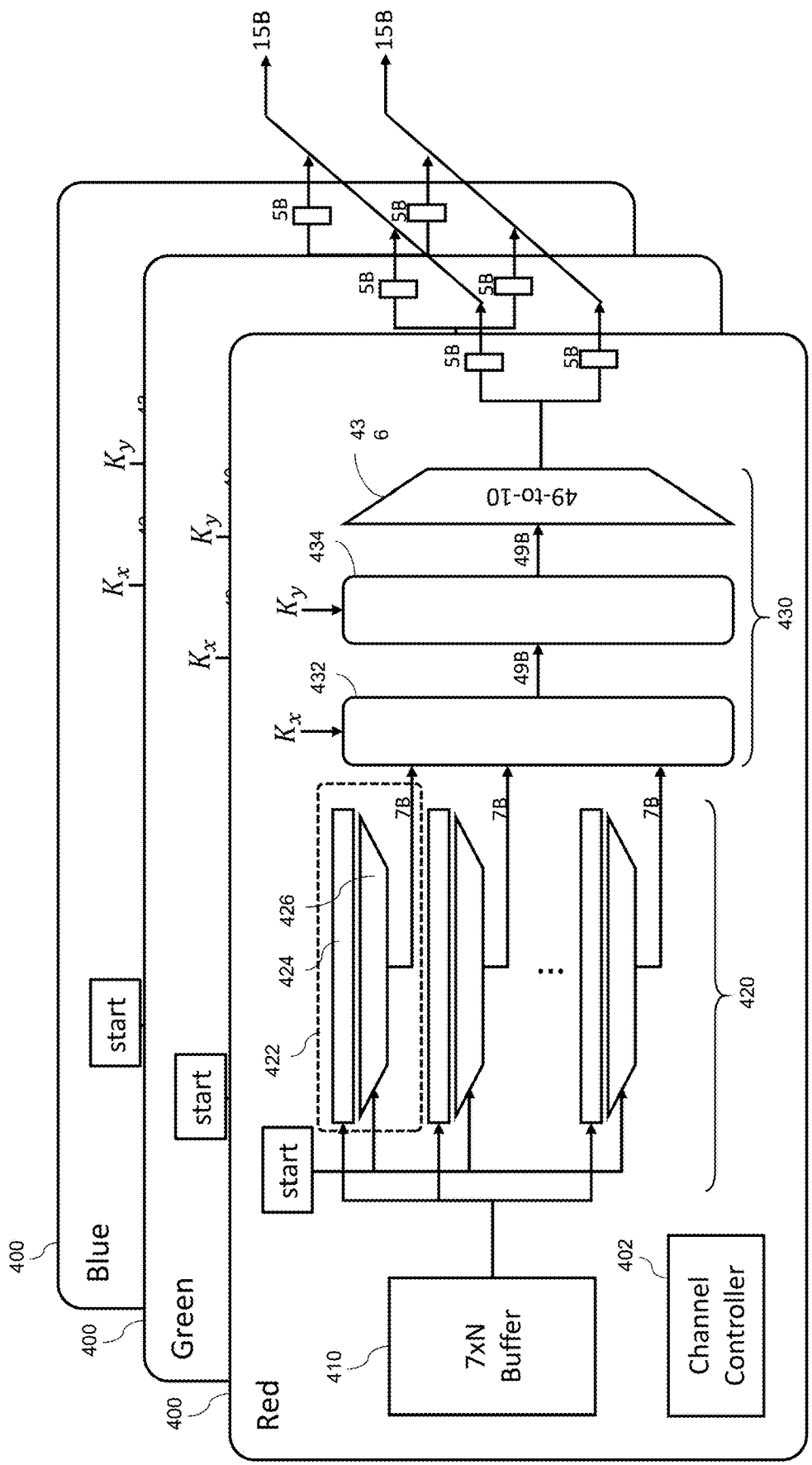
FIG. 11 is a schematic diagram illustrating the image flattener including red, green, and blue channel flatteners, according to some embodiments of the present disclosure.

FIG. 11 is a schematic diagram illustrating the RGB flattener 40 including the red, green, and blue channel flatteners 400, according to some embodiments of the present disclosure.

As shown in FIG. 11, each channel flattener 400 produces a first 5-element group and a second 5-element group. The three first 5-element groups, which have a total of 15 values, may be provided to a first tile (e.g., to the 16-element DP unit 100 of Tile® in FIG. 5C) and the three second 5-element groups, which also have a total of 15 values, may be provided to a second tile (e.g., to the 16-element DP unit 102 of Tile1 in FIG. 5C).

Accordingly, the RGB flattener 40 may flatten/reorganize the pixel values of a sub-window of an input image into two tiles to be processed in one cycle.

While in the description of FIGS. 6 and 10-11, the rearranging circuit 430 utilizes first and second reordering circuits 432 and 433, embodiments of the present disclosure are not limited thereto. For example, the first and second reordering circuits 432 and 433 may be merged into a single reordering circuit that receives the first region 411 from the max sub-window isolator 420 and generates the second one-dimensional vector 435 based on the size (e.g., $K_x$ and $K_y$) of the kernel. However, a combined reordering circuit would have to be designed to accommodate $K_{ymax} \times K_{xmax}$ (e.g., 7×7=49) possible kernel size scenarios, which could result in a relatively large circuit. On the other hand, each of the first and second reordering circuits 432 and 433 is designed to respectively accommodate $K_{ymax}$ and $K_{xmax}$ possible kernel size scenarios, for a sum total of $K_{ymax} K_{xmax}$ (e.g., 7+7=14) possible scenarios, which results in a relatively smaller circuit. In other words, using two reordering circuits instead of one may result in lower area and reduced power consumption relative to having one single reordering circuit.

Further, while the FIGS. 6 and 10 illustrate the first ordering circuit 432 selecting across columns of the first region 411 and the second ordering circuit 434 selecting across rows of the first region 411, embodiments of the present disclosure are not limited thereto, and the column/row selections of these two circuits may be reversed.

As described herein, the image flattener of the inference system according to some embodiments of the present disclosure provides significant improvement in the processing speed of the RGB layer of the inference system over other inference accelerators of the related art.

Further, as the image flattener of the inference system, according to some embodiments, is implemented in a dedicated hardware (rather than in software or DSP), the processing performance of the image flattener is further improved as compared to solutions of the related art.

The neural network referred to in this disclosure may, according to some examples, be a convolutional neural network (ConvNet/CNN), which can take in an input image/video, assign importance (e.g., via learnable weights and biases) to various aspects/objects in the image/video and be able to differentiate one from the other. However, embodiments of the present disclosure are not limited thereto. For example, the neural network may be a recurrent neural network (RNN) with convolution operation, or the like.

As understood by a person of ordinary skill in the art, the operations performed by the controller 20 and the channel controller 402 may be performed by a processor. A memory local to the processor may have instructions that, when executed, cause the processor to perform the controller's operations.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

The inference system and/or any other relevant devices or components according to embodiments of the present disclosure described herein, such as the controller and channel controller, may be implemented by utilizing any suitable hardware, firmware (e.g., an application-specific integrated circuit), software, or any suitable combination of software, firmware, and hardware. For example, the various components of the inference system may be formed on one integrated circuit (IC) chip or on separate IC chips. Further, the various components of the inference system may be implemented on a flexible printed circuit film, a tape carrier package (TCP), a printed circuit board (PCB), or formed on the same substrate. Further, the various components of the inference system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of flattening channel data of an input feature map in an inference system, the method comprising:
   retrieving pixel values of a channel of a plurality of channels of the input feature map from a memory and storing the pixel values in a buffer;
   extracting first values of a first region having a first size from among the pixel values stored in the buffer, the first region corresponding to an overlap region of a kernel of the inference system with channel data of the input feature map;
   rearranging, in a row-major or a column-major order, second values corresponding to the overlap region of the kernel from among the first values in the first region into a single one-dimensional vector;
   identifying a first group of consecutive values from among the rearranged second values of the single one-dimensional vector for supplying to a first dot-product circuit of the inference system; and
   identifying a second group of consecutive values from among the rearranged second values of the single one-dimensional vector for supplying to a second dot-product circuit of the inference system.

2. The method of claim 1, wherein a size of the buffer exceeds a maximum supported kernel size of a first layer of the inference system.

3. The method of claim 1, wherein the first size is equal to a maximum supported kernel size of a first layer of the inference system.

4. The method of claim 1, wherein the buffer is 2-dimensional first-in-first-out storage configured to store data in a circular manner.

5. The method of claim 1, wherein the retrieving the pixel values from the memory and storing the pixel values in the buffer comprises:
   retrieving a group of values from the memory in a column-major order;
   identifying a subset of values among the retrieved group of values corresponding to a column of the buffer; and
   storing the subset of values in the column of the buffer.

6. The method of claim 5, wherein the buffer is a circular buffer having a start pointer and an end pointer, the end pointer indicating an index of the column of the buffer in which the subset of values is stored, and
   wherein the retrieving the pixel values from the memory and storing the pixel values in the buffer further comprises:
      updating the start and end pointers in response to the storing the subset of values.

7. The method of claim 1, wherein the extracting the first values from the buffer comprises:
   storing a row of values from the buffer in a row buffer; and
   extracting a plurality of consecutive elements from the stored row of values beginning from a starting location along the row of values,
   wherein the first values comprise the plurality of consecutive elements.

8. The method of claim 1, wherein the rearranging the second values comprises:
   identifying a second region comprising a number of columns of the first region that correspond to the overlap region; and
   rearranging values of the second region into a first one-dimensional vector,
   wherein the values of the second region form a first set of elements along the first one-dimensional vector.

9. The method of claim 8, wherein the rearranging the values of the second region is performed in a row-major order.

10. The method of claim 8, wherein the rearranging the second values further comprises:
    identifying the second values from among values of the first one-dimensional vector that correspond to the overlap region; and
    rearranging the second values into a second one-dimensional vector,
    wherein the second values form a first set of elements along the second one-dimensional vector.

11. The method of claim 1, further comprising:
loading the first group of consecutive values into an activation vector of the first dot-product circuit,
wherein the first dot-product circuit is configured to calculate an inner product of the activation vector and a preloaded kernel weight vector.

12. The method of claim 1, further comprising:
wherein the second group of consecutive values is consecutive to the first group of consecutive values.

13. The method of claim 12, wherein the first and second group of consecutive values together comprise flattened pixel values of a channel of the input feature map that overlap with the kernel.

14. The method of claim 1, wherein the first size is 7×7 elements, and a size of the buffer is 7×N elements, where N is an integer greater than or equal to 7.

15. A method of accelerating convolution of an input feature map in an inference system comprising a dot-product circuit, the method comprising:
loading kernel weights corresponding to a channel of the plurality of channels of the input feature map into a kernel weight vector of the dot-product circuit;
flattening channel data of the input feature map by:
retrieving pixel values of a channel of a plurality of channels of the input feature map from a memory and storing the pixel values in a buffer;
extracting first values of a first region having a first size from among the pixel values stored in the buffer, the first region corresponding to an overlap region of a kernel of the inference system with channel data of the input feature map;
rearranging, in a row-major or a column-major order, second values corresponding to the overlap region of the kernel from among the first values in the first region into a single one-dimensional vector;
identifying a first group of consecutive values from among the rearranged second values of the single one-dimensional vector for supplying to a first dot-product circuit of the inference system; and
identifying a second group of consecutive values from among the rearranged second values of the single one-dimensional vector for supplying to a second dot-product circuit of the inference system;
loading the first group of consecutive values into a first activation vector of the first dot-product circuit and the second group of consecutive values into a second activation vector of the second dot-product circuit; and
calculating an inner product of the first and second activation vectors and the kernel weight vector to generate an output feature map.

16. The method of claim 15, wherein the flattening the channel data further comprises:
wherein the second group of consecutive values is consecutive to the first group of consecutive values.

17. The method of claim 16, wherein the first and second group of consecutive values together comprise flattened pixel values of a channel of the input feature map that overlap with the kernel.

18. The method of claim 16, further comprising:
loading the second group of consecutive values into the activation vector of the dot-product circuit.

19. An image flattening circuit for flattening channel data of an input feature map in an inference system, the flattener comprising:
a channel controller configured to retrieve pixel values of a channel of a plurality of channels of the input feature map from a memory and storing the pixel values in a buffer;
a max sub-window isolator configured to extract first values of a first region having a first size from among the pixel values stored in the buffer, the first region corresponding to an overlap region of a kernel of the inference system with channel data of the input feature map; and
a rearranging circuit configured to rearrange, in a row-major or a column-major order, second values corresponding to the overlap region of the kernel from among the first values in the first region into a single one-dimensional vector, to identify a first group of consecutive values from among the rearranged second values of the single one-dimensional vector for supplying to a first dot-product circuit of the inference system, and to identify a second group of consecutive values from among the rearranged second values of the single one-dimensional vector for supplying to a second dot-product circuit of the inference system.

20. The image flattening circuit of claim 19, wherein the plurality of channels of the input feature map comprise a red channel, a green channel, and a blue channel.

* * * * *